(12) United States Patent
Okada

(10) Patent No.: US 7,324,250 B2
(45) Date of Patent: Jan. 29, 2008

(54) IMAGE FORMING APPARATUS

(75) Inventor: Masanori Okada, Osaka (JP)

(73) Assignee: Kyocera Mita Corporation (JP)

( * ) Notice: Subject to any disclaimer, the term of this patent is extended or adjusted under 35 U.S.C. 154(b) by 0 days.

(21) Appl. No.: 11/447,187

(22) Filed: Jun. 5, 2006

(65) Prior Publication Data

US 2007/0008600 A1   Jan. 11, 2007

(30) Foreign Application Priority Data

Jul. 11, 2005   (JP) .............................. 2005-201313

(51) Int. Cl.
*G02B 26/08*   (2006.01)
(52) U.S. Cl. ...................................... 359/199; 359/213
(58) Field of Classification Search ................ 359/212, 359/213, 214, 199, 223, 225
See application file for complete search history.

(56) References Cited

U.S. PATENT DOCUMENTS 4,135,902 A * 1/1979 Oehrle ........................ 65/392

4,258,246 A * 3/1981 Karube et al. ............... 359/213
6,717,449 B2 * 4/2004 Tamiya et al. ............... 327/308

FOREIGN PATENT DOCUMENTS

JP   7-154544   6/1995
JP   2001-228434   8/2001

* cited by examiner

*Primary Examiner*—Euncha P. Cherry
(74) *Attorney, Agent, or Firm*—Gerald E. Hespos; Anthony J. Casella

(57) ABSTRACT

Disclosed is an image forming apparatus capable of keeping an oscillation angle of an oscillating mirror at a constant value based on control of a drive frequency. In this image forming apparatus, a semiconductor laser emits a light beam, and an oscillating mirror reflects the light beam emitted from the semiconductor laser, onto a target surface in a scanning manner. An oscillating-mirror drive circuit unit supplies a drive signal having a feature that a drive voltage varies based on a drive frequency, to the oscillating mirror, to reciprocatingly oscillate the oscillating mirror within a given angular range. A voltage-variation detection circuit detects a variation amount of the drive voltage, and a drive-frequency generation circuit alters the drive frequency depending on the variation amount of the drive voltage detected by the voltage-variation detection circuit.

4 Claims, 6 Drawing Sheets

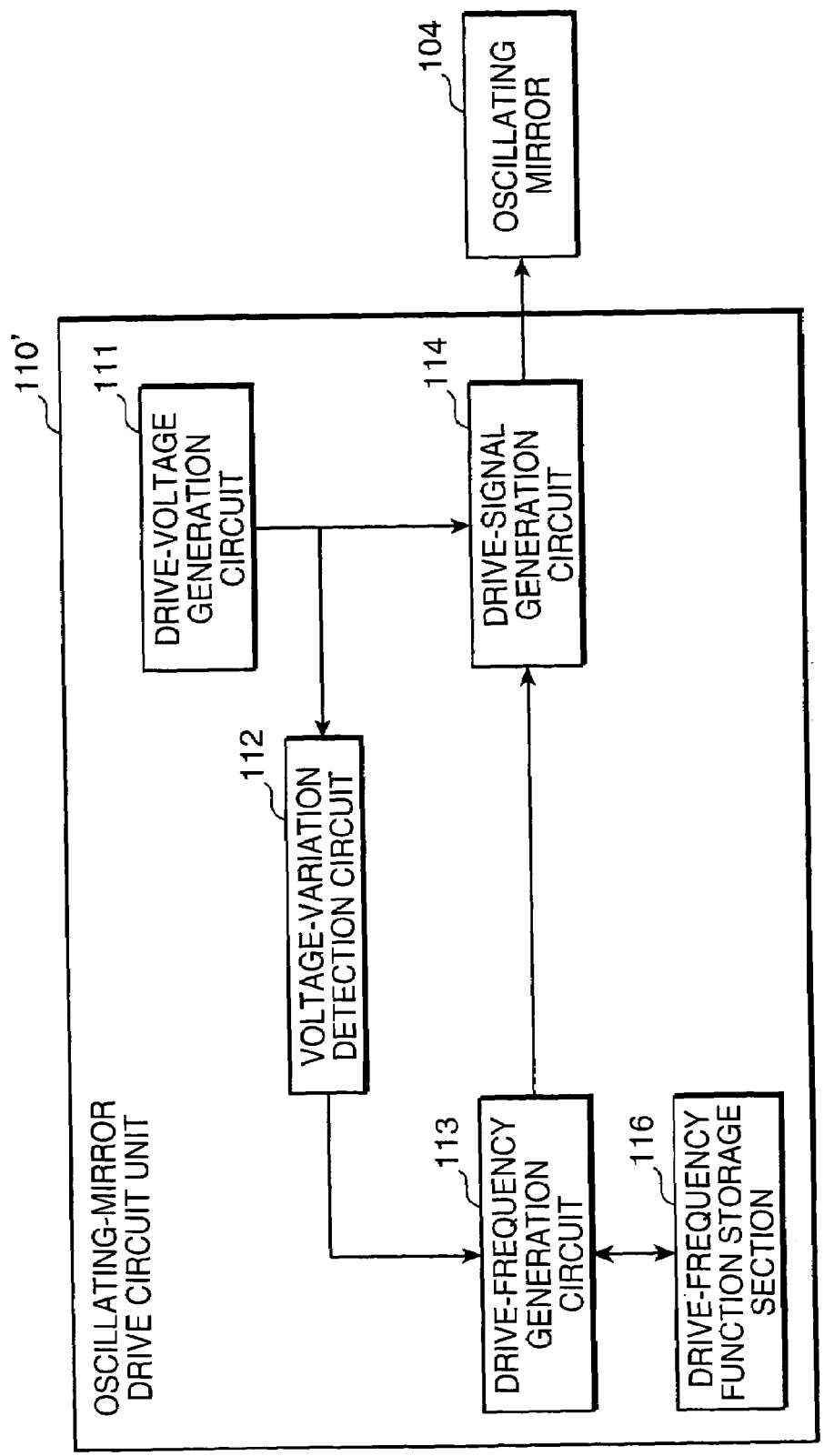

IMAGE FORMING APPARATUS

BACKGROUND OF THE INVENTION

1. Field of the Invention

The present invention relates to an image forming apparatus for forming an image using laser light.

2. Description of the Related Art

Heretofore, laser scanning means with a galvanometer mirror has been widely used in image forming apparatuses, such as a copying machine, a printer and a facsimile machine. In such an image forming apparatus, the galvanometer mirror is designed to be oscillated (swingingly moved or reciprocatingly rotated) within a given angular range in a constant cycle so as to reciprocatingly move a beam of light in a scanning manner to form an image at a high speed.

The galvanometer mirror has the problem that its operating frequency fluctuates depending on an operating condition, such as drive voltage. As measures for solving this problem, Japanese Patent Laid-Open Publication No. 07-154544 discloses a correction technique of comparing a scanning speed of a light beam with a predetermined scanning speed to adjust a frequency of an image-data write clock based on the comparison result. Japanese Patent Laid-Open Publication No. 2001-228434 discloses another correction technique of monitoring an oscillation range of a light beam to adjust a drive current value for a galvanometer mirror in such a manner as to allow the oscillation range to become approximately equal to a predetermined target oscillation range.

The former conventional technique is required to perform a complicate control including the steps of detecting a scanning speed of a light beam, comparing the detected scanning speed with a predetermined scanning speed and adjusting a frequency of an image-data write clock based on the comparison result. The latter conventional technique has a problem about structural complexity due to a sensor necessary for monitoring an oscillation range of the galvanometer mirror.

SUMMARY OF THE INVENTION

In view of the above problems, it is an object of the present invention to provide an image forming apparatus capable of keeping an oscillation angle of an oscillating mirror at a constant value based on control of a drive frequency.

According to one aspect of the present invention, there is provided an image forming apparatus which comprises: a light source section for emitting a light beam; an oscillating mirror adapted to be reciprocatingly oscillated while reflecting the light beam emitted from the light source section, onto a surface of a photosensitive drum, so as to scan the surface of the photosensitive drum with the reflected light beam; and an oscillating-mirror drive unit for supplying to the oscillating mirror a drive signal for reciprocatingly oscillating the oscillating mirror within a given angular range. The oscillating-mirror drive unit includes a detection section for detecting a variation amount of a drive voltage of the drive signal, and a drive-frequency alteration section for altering a drive frequency of the drive signal depending on the variation amount of the drive voltage detected by the detection section.

In the above image forming apparatus, the drive signal is supplied to the oscillating mirror to reciprocatingly oscillate the oscillating mirror within the given angular range. Further, a variation amount of the drive voltage of the drive signal is detected, and the drive frequency of the drive signal is altered depending on the detected variation amount of the drive voltage. Thus, based on a simplified configuration allowing the drive frequency to be altered depending on variation amounts of the drive voltage, an oscillation angle of the oscillating mirror can be kept at a constant value, without the need for complicated control and structural complexity as in the conventional techniques.

BRIEF DESCRIPTION OF THE DRAWINGS

FIG. 6 is a block diagram showing an electrical configuration of the oscillating-mirror drive circuit unit for driving an oscillating mirror in another embodiment of the invention.

DETAILED DESCRIPTION OF THE PREFERRED EMBODIMENTS

With reference to the drawings, an embodiment of the present invention will now be described. The following embodiment will be shown and described by way of one specific example of the present invention, but is not intended to limit the invention defined in the appended claims thereto.

Figure 1:
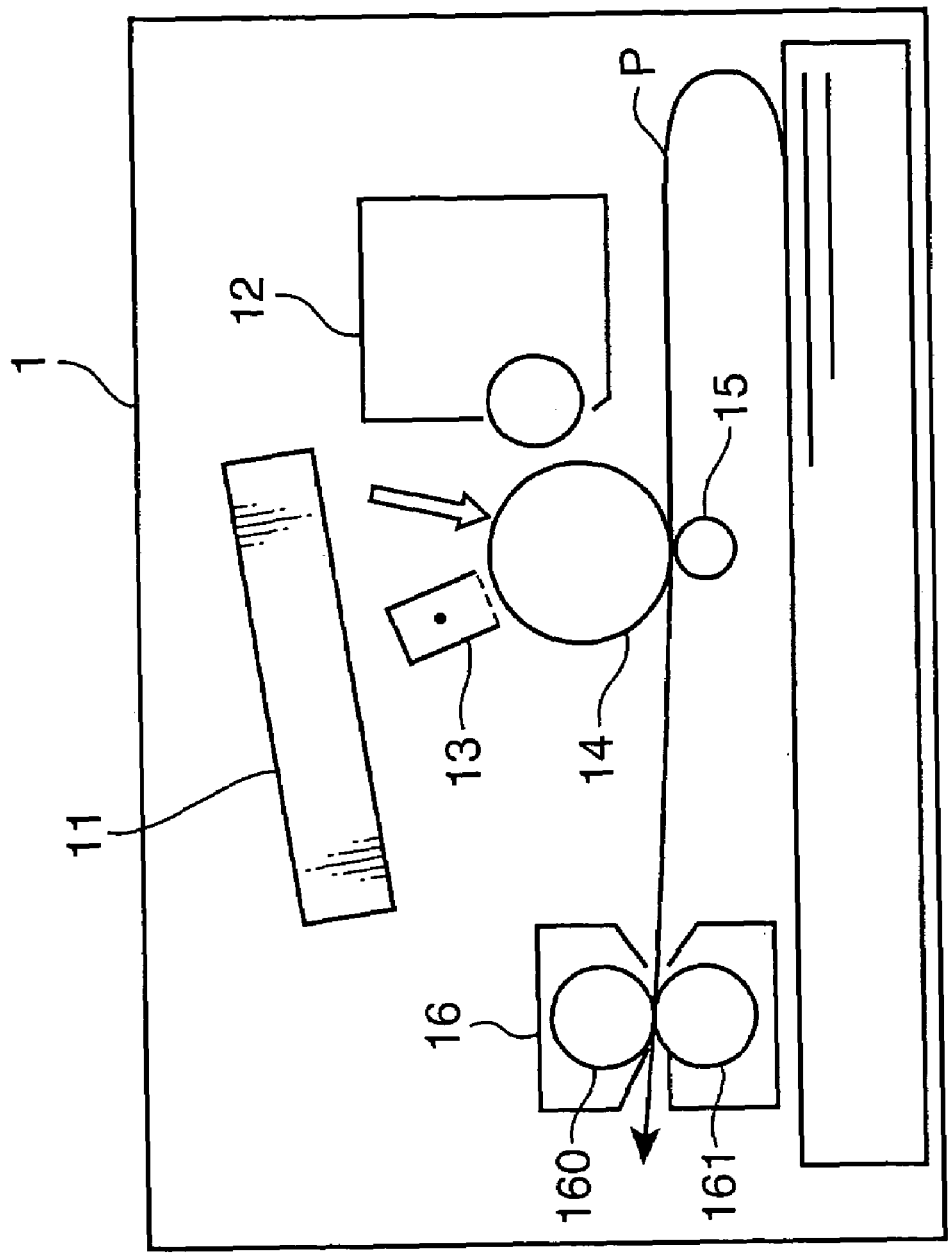
FIG. 1 is a schematic diagram showing a mechanical configuration of a printer as an image forming apparatus according to one embodiment of the present invention.

FIG. 1 is a schematic diagram showing a mechanical configuration of a printer 1 as an image forming apparatus according to one embodiment of the present invention. The printer 1 illustrated in FIG. 1 comprises a laser scanner 11, a developing device 12, a charging device 13, a photosensitive drum 14, a transfer roller 15 and a fixing device 16.

The photosensitive drum 14 is a cylindrical-shaped member, and designed to be rotated in a clockwise (in FIG. 1) direction by a driving force received from a motor (not shown). The charging device 13 is operable to electrostatically charge a surface of the photosensitive drum 14 approximately uniformly. The laser scanner 11 is equipped with a light source, such as a laser diode, and operable to emit a light signal corresponding to image data, onto the surface of the photosensitive drum 14 approximately uniformly charged by the charging device 13, so as to form an electrostatic latent image thereon. The printer 1 is designed to receive image data transmitted from an external device electrically connected thereto, such as a personal computer (PC), and produce the above light signal corresponding to the received image data. The laser scanner 11 will be described in more detail later in connection with FIG. 2.

The developing device 12 is equipped with a toner container for housing toner, and operable to supply the toner onto the surface of the photosensitive drum 14 formed the electrostatic latent image so as to form a toner image thereon. This toner image formed on the photosensitive drum 14 will be transferred onto a recording sheet which is being fed along a feed passage P, or a transfer belt (not shown), by the transfer roller 15, as described below.

The transfer roller 15 is disposed in opposed relation to the photosensitive drum 14. The transfer roller 15 is made, for example, of a rubber material having electrical conductivity, and operable to transfer the toner image formed on the photosensitive drum 14, onto the recording sheet which is being fed along the feed passage P, or the transfer belt.

The fixing device 16 includes a fixing roller 160 having a built-in heating element, such as a heater, and a pressing roller 161 disposed in opposed relation to the fixing roller 160. The fixing device 16 is operable to heat and feed the recording sheet formed with the toner image so as to fix the toner image onto the recording sheet.

An image forming operation of the printer 1 will be briefly described below. Firstly, the charging device 13 electrostatically charges the surface of the photosensitive drum 14 serving as an image supporting member, approximately uniformly. Then, the laser scanner 11 exposes the charged surface of the photosensitive drum 14 to a light signal in such a manner that an electrostatic latent image corresponding to an image to be formed on a recording sheet is formed on the surface of the photosensitive drum 14. Then, the developing device 12 attaches toner onto the surface of the photosensitive drum 14 to allow the electrostatic latent image to be formed as a visible toner image, and the toner image on the surface of the photosensitive drum 14 is transferred onto a surface of the recording sheet by the transfer roller 15. After this operation, the toner image transferred to the recording sheet is fixed onto the recording sheet through the fixing device 16.

Figure 2:
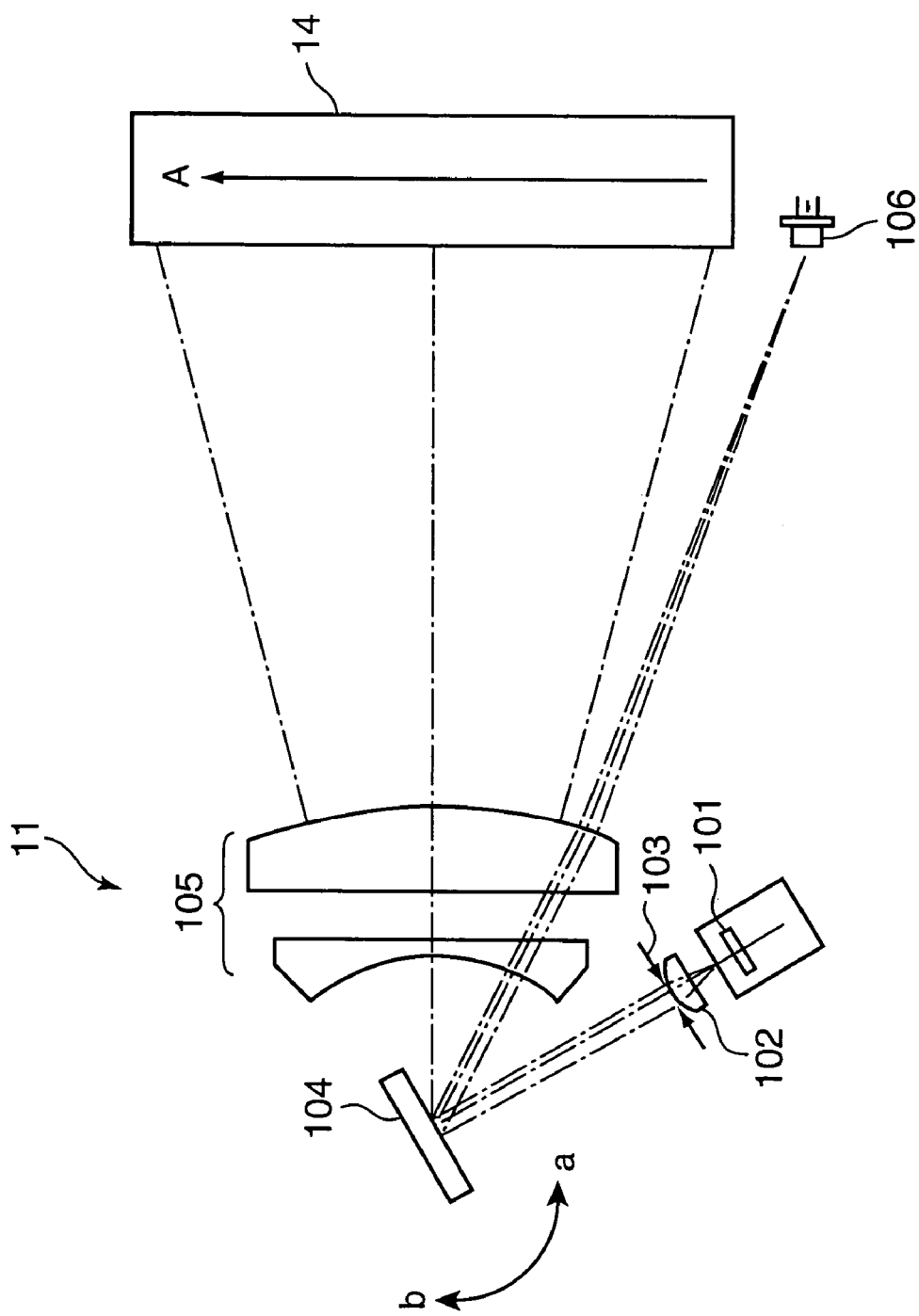
FIG. 2 is a schematic diagram showing a mechanical configuration of a laser scanner illustrated in FIG. 1.

FIG. 2 is a schematic diagram showing a mechanical configuration of the laser scanner 11 illustrated in FIG. 1. The laser scanner 11 comprises a semiconductor laser 101, a collimator lens 102, an aperture diaphragm 103, an oscillating mirror 104, a lens assembly 105 and a BD (Beam Detect) sensor 106.

The semiconductor laser 101 is operable to emit laser light having a given wavelength. The collimator lens 102 and the aperture diaphragm 103 are cooperatively operable to allow the laser light generated from the semiconductor laser 101 to be formed as parallel light. The oscillating mirror 104 is composed, for example, of a galvanometer mirror which is a resonant deflection element. For example, the oscillating mirror 104 comprises a movable coil and a mirror attached to a shaft of the movable coil. In this case, the oscillating mirror 104 may be designed such that the mirror attached to the shaft of the movable coil is swingingly moved by a driving force based on an electromagnetic force generated in proportion to a current applied to the movable coil placed in a magnetic field. The oscillating mirror 104 is swingingly moved in directions indicated by the arrows "a", "b" in FIG. 2, to move the laser light generated from the semiconductor laser 101, in such a manner as to scan the surface of the photosensitive drum 14 in a longitudinal direction thereof (main scanning direction). More specifically, when the oscillating mirror 104 is swingingly moved in the direction indicated by the arrow "a", the laser light is scanningly moved in a direction indicated by the arrow A in FIG. 2 to perform a data write operation during this movement. The lens assembly 105 is operable to correct the laser light reflected by the oscillating mirror 104, in such a manner as to be scanningly moved along the surface of the photosensitive drum 14 at a constant speed.

The BD sensor 106 is operable to detect the laser light reflected by the oscillating mirror 104. A detection signal detected by the BD sensor 106 is used for synchronizing the swing movement of the oscillating mirror 104 and the data write operation. That is, the BD sensor 106 serves as a means to synchronize the data write operation in the direction indicated by the arrow A.

The oscillating mirror 104 is swingingly moved in this manner to perform an exposure operation for one line of image data in the main scanning direction, to the photosensitive drum 14. Then, when the photosensitive drum 14 is rotated in an auxiliary scanning direction by one line, another exposure operation for one line of image data in the main scanning direction will be performed.

Figure 3:
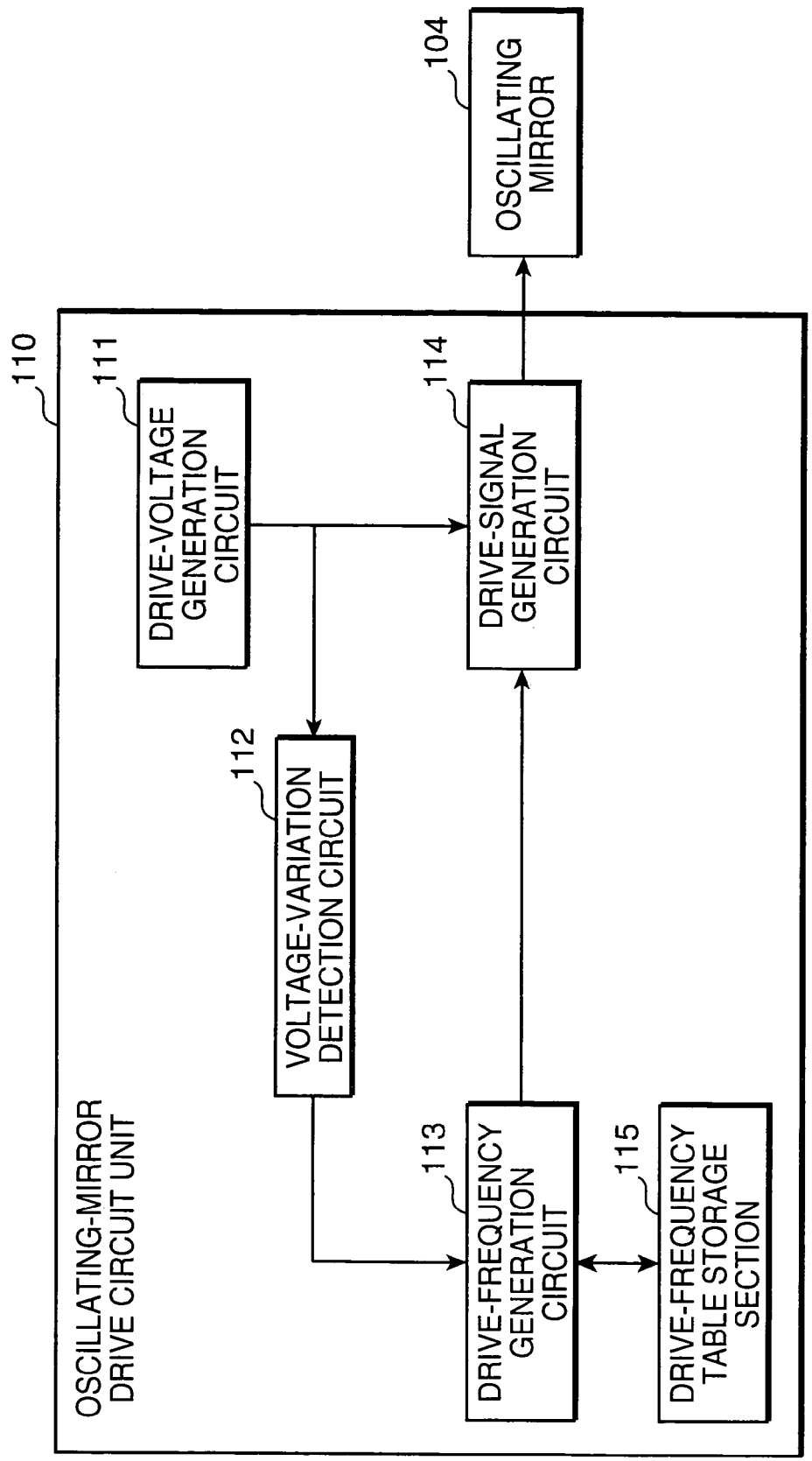
FIG. 3 is a block diagram showing an electrical configuration of an oscillating-mirror drive circuit unit for driving an oscillating mirror.

FIG. 3 is a block diagram showing an electrical configuration of an oscillating-mirror drive circuit unit 110 for driving the oscillating mirror 104. The oscillating-mirror drive circuit unit 110 is operable to supply a drive signal represented by a sinusoidal curve to the oscillating mirror 104 so as to reciprocatingly oscillate the oscillating mirror 104 within a given angular range. The oscillating-mirror drive circuit unit 110 comprises a drive-voltage generation circuit 111, a voltage-variation detection circuit 112, a drive-frequency generation circuit 113, a drive-signal generation circuit 114 and a drive-frequency table storage section 115.

Figure 4:
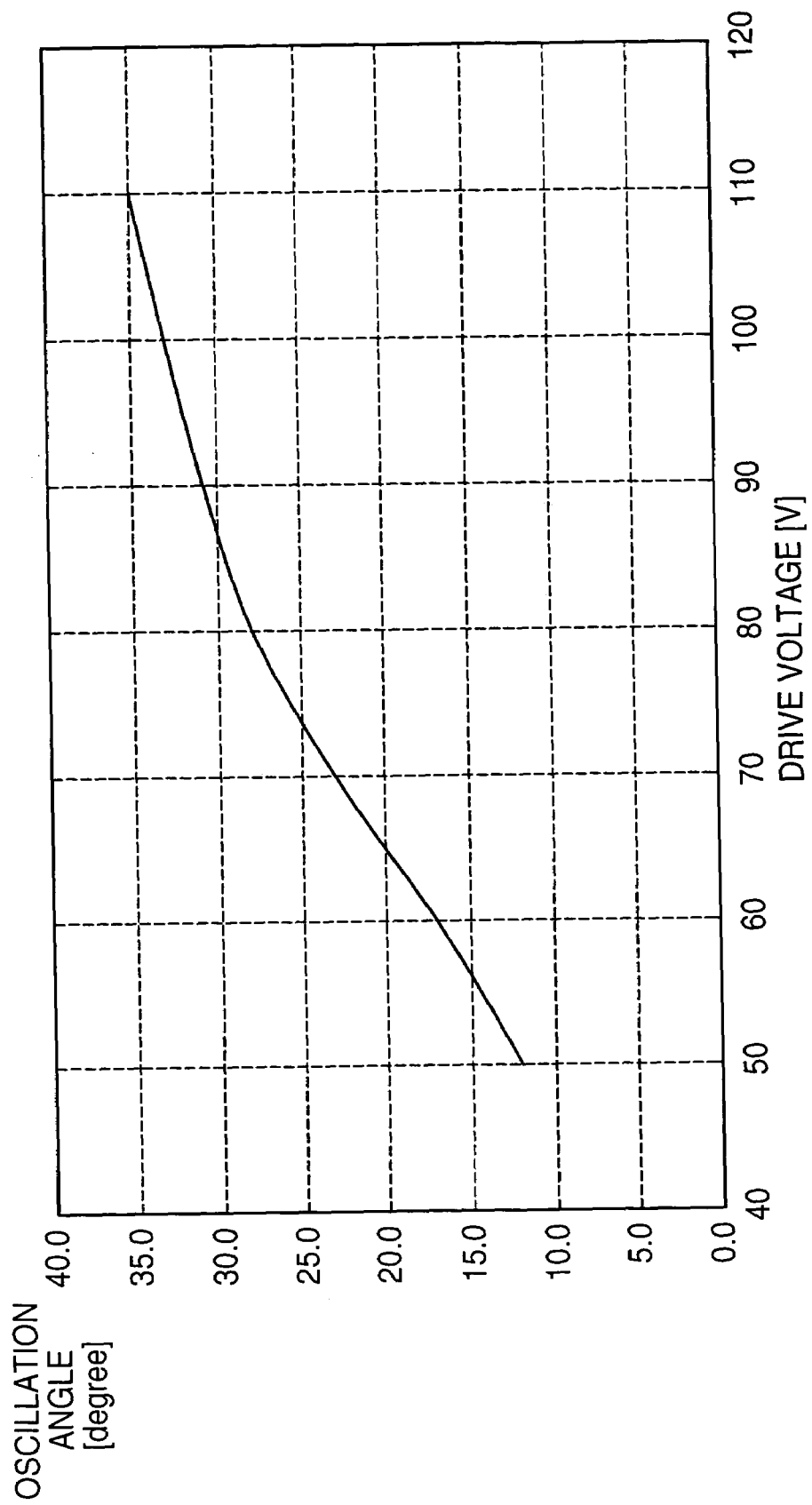
FIG. 4 is a graph showing one example of a characteristic curve of an oscillation angle versus a drive voltage for driving the oscillating mirror.

The drive-voltage generation circuit 111 is operable to generate a drive voltage for driving the oscillating mirror 104 and output the generated drive voltage to each of the voltage-variation detection circuit 112 and the drive-signal generation circuit 114. FIG. 4 is a graph showing one example of a characteristic curve of an oscillation angle versus the drive voltage for driving the oscillating mirror 104. As shown in FIG. 4, the oscillating mirror 104 has a characteristic that the oscillation angle becomes larger as the drive voltage is increased. For example, when the oscillating mirror 104 is driven by the drive voltage set at 60 V (Volt), the oscillation angle becomes 17 degrees. Further, when the oscillating mirror 104 is driven by the drive voltages set at 80 V and 100 V, the oscillation angle becomes 28 degrees and 33 degrees, respectively. As used in this specification, the term "oscillation angle" means an angle between a normal line relative to a mirror surface of the oscillating mirror 104 located at an initial position (the position illustrated in FIG. 2) and a normal line relative to the mirror surface after the oscillating mirror 104 is oscillated.

Figure 5:
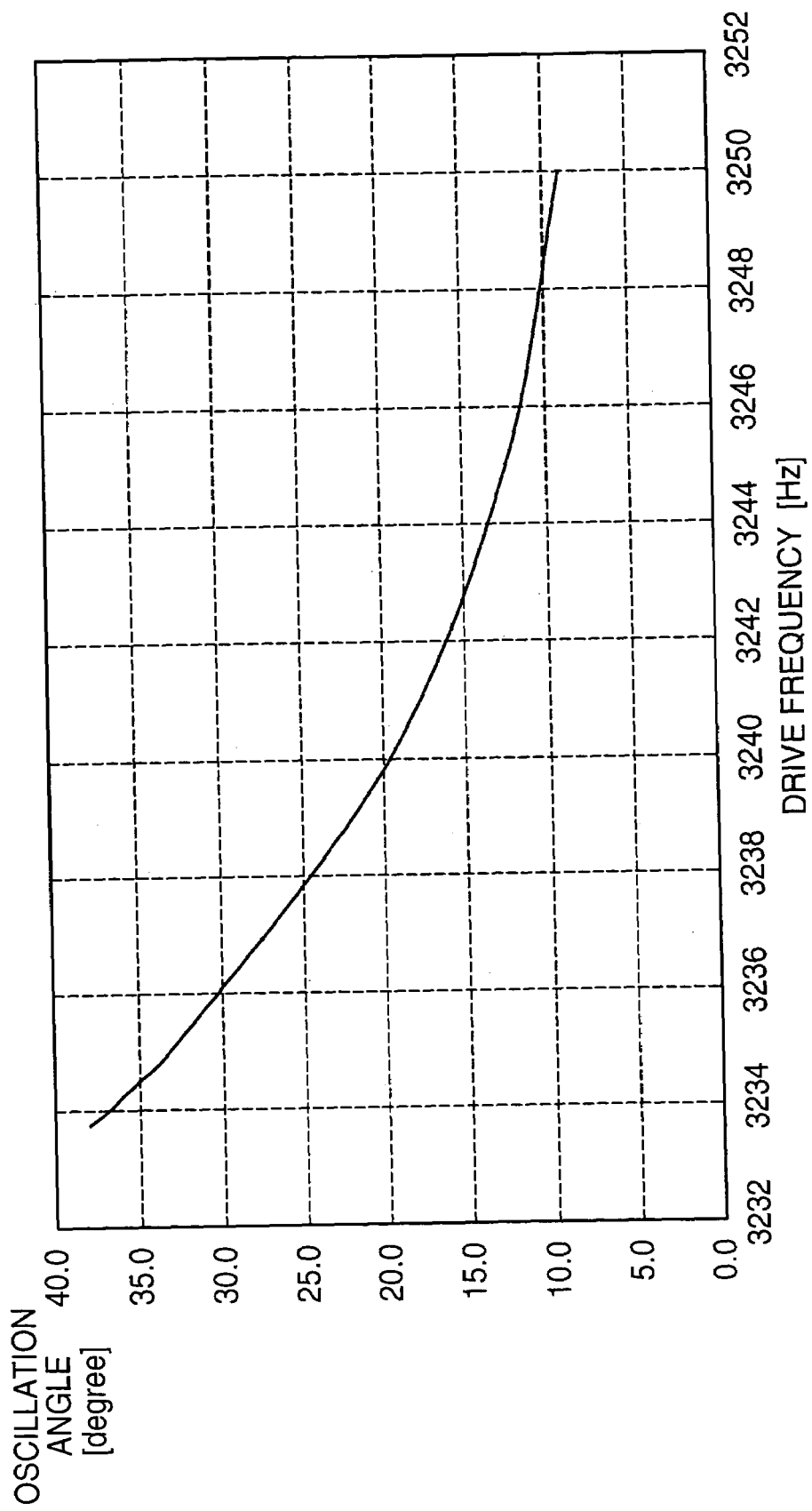
FIG. 5 is a graph showing one example of a characteristic curve of the oscillation angle versus a drive frequency for driving the oscillating mirror.

The drive-frequency generation circuit 113 is operable to generate a variable-frequency sinusoidal signal or a drive frequency (drive clock) for driving the oscillating mirror 104. FIG. 5 is a graph showing one example of a characteristic curve of the oscillation angle versus the drive frequency for driving the oscillating mirror 104. As shown in FIG. 5, the oscillating mirror 104 has a characteristic that the oscillation angle becomes smaller as the drive frequency is increased. For example, when the oscillating mirror 104 is driven by the drive frequency set at 3235 Hz (Hertz), the oscillation angle becomes 33 degrees. Further, when the oscillating mirror 104 is driven by the drive frequencies set at 3237 Hz and 3241 Hz, the oscillation angle becomes 28 degrees and 17 degrees, respectively. It is understood that characteristics of the oscillation angle in the oscillating mirror 104 are not limited to those illustrated in FIGS. 4 and 5.

The drive-signal generation circuit 114 is operable to generate a drive signal having a feature that the drive voltage generated by the drive-voltage generation circuit 111 varies based on the drive clock generated by the drive-frequency generation circuit 113, and output the generated drive signal to the oscillating mirror 104. The oscillating mirror 104 is designed to be swingably moved in response to the drive signal generated by the drive-signal generation circuit 114 so as to reflect the laser light onto the surface of the photosensitive drum 14 in a scanning manner.

The voltage-variation detection circuit 112 is operable to detect a variation amount of the drive voltage generated by the drive-voltage generation circuit 111, and output the detected voltage variation amount to the drive-frequency generation circuit 113. The drive-frequency table storage section 115 stores drive frequencies corresponding to respective variation amounts of the drive voltage, in the form of a table. The drive-frequency generation circuit 113 is operable to correct the drive frequency depending on voltage variation amounts detected by the voltage-variation detection circuit 112 so as to control the oscillation angle of the oscillating mirror 104 in such a manner as to be kept at a constant value. Specifically, the drive-frequency generation circuit 113 is operable to read the drive frequency corresponding to a variation amount of the drive voltage detected by the voltage-variation detection circuit 112, from the drive-frequency table storage section 115, and then alter a current or existing drive frequency to the drive frequency read from the drive-frequency table storage section 115.

The above drive-frequency correcting operation in the drive-frequency generation circuit 113 will be more specifically described below. As one example, given that the drive-signal generation circuit 114 generates a drive signal having the drive voltage set at 80 V and the drive clock set at a frequency of 3237 Hz during an image forming operation to drive the oscillating mirror 104 by this drive signal. In this case, the oscillating mirror 104 is swingably moved at an oscillation angle of 28 degrees. Then, if a power supply voltage is varied due to change in load condition of the image forming apparatus, such as attachment of an optional unit, and thereby the drive voltage is changed, for example, from 80 V to 70V, the oscillation angle of the oscillating mirror 104 will be reduced to 23 degrees as shown in FIG. 4 to shorten an image in a moving direction of the light beam (main scanning direction) unless adequate measures are taken.

In such a situation, the drive-frequency generation circuit 113 can reduce the drive clock from 3237 Hz to 3235 Hz to keep the oscillation angle at 28 degrees. Specifically, in the above case, the voltage-variation detection circuit 112 detects that a variation amount of the drive voltage generated by the drive-voltage generation circuit 111 is −10 V. Then, the voltage-variation detection circuit 112 outputs the detected voltage variation amount (−10 V) to the drive-frequency generation circuit 113. The drive-frequency generation circuit 113 reads the drive frequency (3235 Hz) corresponding to the voltage variation amount (−10 V) detected by the voltage-variation detection circuit 112, from the drive-frequency table storage section 115, and then alters the existing drive frequency (3237 Hz) to the drive frequency (3235 Hz) read from the drive-frequency table storage section 115.

In this manner, the frequency of the drive clock is altered depending on voltage variation amounts of the drive voltage. This makes it possible to control the drive frequency in such a manner as to keep the oscillation angle of the oscillating mirror 104 at a constant value, without the need for performing a complicated control, for example, of detecting a scanning speed of a light beam, comporting the detected scanning speed with a reference speed and adjusting a frequency of an image-data write clock based on the comparison result, or monitoring the oscillation angle of the oscillating mirror 104.

The drive-frequency generation circuit 113 may be composed, for example, of a voltage control oscillator. In this case, the frequency of the drive clock can be altered without software-based control.

While the embodiment has been described in connection with the example where the drive voltage is lowered, the present invention can also be utilized to correct the drive frequency when the drive voltage is increased. As one example, given that the drive-signal generation circuit 114 generates a drive signal having the drive voltage set at 80 V and the drive clock set at a frequency of 3237 Hz during an image forming operation to drive the oscillating mirror 104 by this drive signal. In this case, the oscillating mirror 104 is swingably moved at an oscillation angle of 28 degrees. Then, if a power supply voltage is varied due to change in load condition of the image forming apparatus, such as detachment of an optional unit, and thereby the drive voltage is changed, for example, from 80 V to 100V, the oscillation angle of the oscillating mirror 104 will be increased to 33 degrees as shown in FIG. 4 to widen an image in the moving direction of the light beam (main scanning direction) unless adequate measures are taken.

In such a situation, the drive-frequency generation circuit 113 can increase the drive clock from 3237 Hz to 3239 Hz to keep the oscillation angle at 28 degrees. Specifically, in the above case, the voltage-variation detection circuit 112 detects that a variation amount of the drive voltage generated by the drive-voltage generation circuit 111 is +20 V. Then, the voltage-variation detection circuit 112 outputs the detected voltage variation amount (+20 V) to the drive-frequency generation circuit 113. The drive-frequency generation circuit 113 reads the drive frequency (3239 Hz) corresponding to the voltage variation amount (+20 V) detected by the voltage-variation detection circuit 112, from the drive-frequency table storage section 115, and then alters the existing drive frequency (3237 Hz) to the drive frequency (3239 Hz) read from the drive-frequency table storage section 115.

As above, a drive signal having a feature that a drive voltage varies based on a drive frequency is supplied to the oscillating mirror 104 to reciprocatingly oscillate the oscillating mirror 104 within a given angular range. Then, in response to detection of a variation amount of the drive voltage, the drive frequency is altered depending on the detected variation amount of the drive voltage. Thus, based on a simplified configuration allowing the drive frequency to be altered depending on variation amounts of the drive voltage, the oscillation angle of the oscillating mirror 104 can be kept at a constant value, without the need for complicated control and structural complexity as in the conventional techniques.

The oscillating mirror 104 has the characteristics that the oscillation angle becomes larger as the drive voltage is increased, and the oscillation angle becomes smaller as the drive frequency is increased. With a focus on these characteristic, a lower drive frequency than an existing drive frequency of the drive signal is generated when the drive voltage is lowered, and a higher drive frequency than an existing drive frequency of the drive signal is generated when the drive voltage is increased. Thus, even if the drive voltage is lowered or increased, a lower or higher drive frequency than an existing drive frequency of the drive signal can be generated to keep the oscillation angle of the oscillating mirror 104 at a constant value.

The drive frequencies corresponding to respective variation amounts of the drive voltage are pre-stored in the drive-frequency table storage section 115 in the form of a table, and the drive frequency corresponding to the detected variation amount of the drive voltage is read from the drive-frequency table storage section 115 to alter the existing drive frequency of the drive signal to the read drive frequency. Thus, the pre-stored table including drive frequencies corresponding to respective variation amounts of the drive voltage makes it possible to eliminate the need for determining a drive frequency corresponding to a detected variation amount of the drive voltage through a calculation so as to reduce a time period required for the operation of determining a drive frequency corresponding to a detected variation amount of the drive voltage.

While the image forming apparatus according to the above embodiment is designed such that the drive-frequency table storage section 115 pre-stores drive frequencies corresponding to respective variation amounts of the drive voltage in the form of a table, and the drive-frequency generation circuit 113 reads the drive frequency corresponding to a variation amount of the drive voltage detected by the voltage-variation detection circuit 112, from the drive-frequency table storage section 115 and then alters an existing drive frequency of the drive signal to the read drive frequency, the present invention is not limited to this configuration. For example, the oscillating-mirror drive circuit unit 110 may be designed to pre-store a mathematical function representing a relationship between variation amounts of the drive voltage and corresponding drive frequencies, and to assign a detected variation amount of the drive voltage to the pre-stored mathematical function so as to calculate the corresponding drive frequency and then alter an existing drive frequency of the drive signal to the calculated drive frequency.

FIG. 6 is a block diagram showing an electrical configuration of the oscillating-mirror drive circuit unit for driving an oscillating mirror in another embodiment of the invention. The oscillating-mirror drive circuit unit 110' illustrated in FIG. 6 comprises a drive-voltage generation circuit 111, a voltage-variation detection circuit 112, a drive-frequency generation circuit 113, a drive-signal generation circuit 114 and a drive-frequency function storage section 116. In FIG. 6, the same component as that in the oscillating-mirror drive circuit unit illustrated in FIG. 3 is defined by the same reference numeral, and its description will be omitted.

The drive-frequency function storage section 116 pre-stores a mathematical function representing a relationship between variation amounts of the drive voltage and corresponding drive frequencies. The drive-frequency generation circuit 113 is operable to assign a variation amount of the drive voltage detected by the voltage-variation detection circuit 112 to the mathematical function pre-stored in the drive-frequency function storage section 116, so as to calculate the corresponding drive frequency, and then alter an existing drive frequency of the drive signal to the calculated drive frequency.

In this case, the mathematical function representing the relationship between variation amounts of the drive voltage and corresponding drive frequencies is pre-stored in the drive-frequency function storage section 116, and the detected variation amount of the drive voltage is assigned to the mathematical function pre-stored in the drive-frequency function storage section 116 to calculate the corresponding drive frequency so as to alter the existing drive frequency of the drive signal to the calculated drive frequency. Thus, the pre-stored mathematical function representing the relationship between variation amounts of the drive voltage and corresponding drive frequencies makes it possible to determine a drive frequency corresponding to a detected variation amount of the drive voltage through a calculation.

While the image forming apparatus according to the above embodiment has the single semiconductor laser 101, the present invention is not limited to this structure. For example, the present invention may be applied to a color-image forming apparatus comprising a plural numbers of the semiconductor lasers 101 provided on a color-by-color basis, or a color-image forming apparatus comprising a plural numbers of the semiconductor lasers 101 provided for each color (or a single color).

Further, while the above embodiment has been described based on a printer as one example of image forming apparatuses, the image forming apparatus of the present invention is not limited to a printer, but may be a copying machine, a facsimile machine or a complex machine having their functions. In this case, an image may be formed based on image data read from a document by an image reading section of the image forming apparatus or image data received by a facsimile receiving section of the image forming apparatus.

The above embodiment includes inventions having the following features.

An image forming apparatus comprising: a light source section for emitting a light beam; an oscillating mirror adapted to be reciprocatingly oscillated while reflecting the light beam emitted from the light source section, onto a surface of a photosensitive drum, so as to scan the surface of the photosensitive drum with the reflected light beam; and an oscillating-mirror drive unit for supplying to the oscillating mirror a drive signal for reciprocatingly oscillating the oscillating mirror within a given angular range. The oscillating-mirror drive unit includes a detection section for detecting a variation amount of a drive voltage of the drive signal, and a drive-frequency alteration section for altering a drive frequency of the drive signal depending on the variation amount of the drive voltage detected by the detection section.

In the above image forming apparatus, the drive signal is supplied to the oscillating mirror to reciprocatingly oscillate the oscillating mirror within the given angular range. Further, a variation amount of the drive voltage of the drive signal is detected, and the drive frequency of the drive signal is altered depending on the detected variation amount of the drive voltage. Thus, based on a simplified configuration allowing the drive frequency to be altered depending on variation amounts of the drive voltage, an oscillation angle of the oscillating mirror can be kept at a constant value, without the need for complicated control and structural complexity as in the conventional techniques.

Preferably, in the above image forming apparatus, the drive-frequency alteration section is operable, when the drive voltage is lowered, to generate a lower drive frequency than an existing drive frequency of the drive signal, and, when the drive voltage is increased, to generate a higher drive frequency than an existing drive frequency of the drive signal.

In the image forming apparatus having this feature, the oscillating mirror has the characteristics that the oscillation angle becomes larger as the drive voltage is increased, and the oscillation angle becomes smaller as the drive frequency is increased. With a focus on these characteristic, a lower drive frequency than an existing drive frequency of the drive signal is generated when the drive voltage is lowered, and a higher drive frequency than an existing drive frequency of the drive signal is generated when the drive voltage is increased. Thus, even if the drive voltage is lowered or increased, this image forming apparatus can generate a lower or higher drive frequency than an existing drive frequency of the drive signal to keep the oscillation angle of the oscillating mirror at a constant value.

Preferably, the above image forming apparatus further includes a table storage section which pre-stores drive frequencies corresponding to respective variation amounts of the drive voltage, in the form of a table. In this case, the drive-frequency alteration section may be operable to read the drive frequency corresponding to the variation amount of the drive voltage detected by the detection section, from the table storage section, and then alter an existing drive frequency of the drive signal to the read drive frequency.

In the image forming apparatus having this feature, the drive frequencies corresponding to respective variation amounts of the drive voltage are pre-stored in the table storage section in the form of a table, and the drive frequency corresponding to the detected variation amount of the drive voltage is read from the table storage section to alter the existing drive frequency of the drive signal to the read drive frequency. Thus, the pre-stored table including drive frequencies corresponding to respective variation amounts of the drive voltage makes it possible to eliminate the need for determining a drive frequency corresponding to a detected variation amount of the drive voltage through a calculation so as to reduce a time period required for the operation of determining a drive frequency corresponding to a detected variation amount of the drive voltage.

Preferably, the above image forming apparatus further includes a function storage section which pre-stores a mathematical function representing a relationship between variation amounts of the drive voltage and corresponding drive frequencies. In this case, the drive-frequency alternation section may be operable to assign the variation amount of the drive voltage detected by the detection section to the mathematical function pre-stored in the function storage section, so as to calculate the corresponding drive frequency, and then alter an existing drive frequency of the drive signal to the calculated drive frequency.

In the image forming apparatus having this feature, the mathematical function representing the relationship between variation amounts of the drive voltage and corresponding drive frequencies is pre-stored in the function storage section, and the detected variation amount of the drive voltage is assigned to the mathematical function pre-stored in the function storage section to calculate the corresponding drive frequency so as to alter the existing drive frequency of the drive signal to the calculated drive frequency. Thus, the pre-stored mathematical function representing the relationship between variation amounts of the drive voltage and corresponding drive frequencies makes it possible to determine a drive frequency corresponding to a detected variation amount of the drive voltage through a calculation.

Preferably, in the above image forming apparatus, the oscillating mirror consists of a galvanometer mirror. In the image forming apparatus having this feature, a galvanometer mirror which is a resonant deflection element can be used as the oscillating mirror.

This application is based on patent application No. 2005-201313 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image forming apparatus comprising:
a light source section for emitting a light beam;
an oscillating mirror adapted to be reciprocatingly oscillated while reflecting the light beam emitted from said light source section onto a surface of a photosensitive drum so as to scan the surface of said photosensitive drum with the reflected light beam and to form an electrostatic latent image corresponding to image data onto the surface of a photosensitive drum; and
an oscillating-mirror drive unit for supplying to said oscillating mirror a drive signal for reciprocatingly oscillating said oscillating mirror within a given angular range,
said oscillating-mirror drive unit including:
a detection section for detecting a variation amount of a drive voltage of the drive signal if a power supply voltage is varied due to change in load condition of the image forming apparatus and; and
a drive-frequency alteration section for altering a drive frequency of the drive signal depending on the variation amount of the drive voltage detected by said detection section; wherein
said drive-frequency alteration section is operable, when the drive voltage is lowered, to generate a lower drive frequency than an existing drive frequency of the drive signal, and, when the drive voltage is increased, to generate a higher drive frequency than an existing drive frequency of the drive signal.

2. The image forming apparatus as defined in claim 1, which further includes a table storage section which pre-stores drive frequencies corresponding to respective variation amounts of the drive voltage, in the form of a table, wherein said drive-frequency alteration section is operable to read the drive frequency corresponding to the variation amount of the drive voltage detected by said detection section, from said table storage section, and then alter an existing drive frequency of the drive signal to said read drive frequency.

3. The image forming apparatus as defined in claim 1, which further includes a function storage section which pre-stores a mathematical function representing a relationship between variation amounts of the drive voltage and corresponding drive frequencies, wherein said drive-frequency alternation section is operable to assign the variation amount of the drive voltage detected by said detection section to the mathematical function pre-stored in said function storage section, so as to calculate the corresponding drive frequency, and then alter an existing drive frequency of the drive signal to said calculated drive frequency.

4. The image forming apparatus as defined in claim 1, wherein said oscillating mirror consists of a galvanometer mirror.

* * * * *